> United States Patent Office 3,481,997
Patented Dec. 2, 1969

3,481,997
INTERMOLECULAR CONDENSATION OF AROMATIC COMPOUNDS
William D. Vanderwerff, West Chester, Pa., assignor to Sun Oil Company, Philadelphia, Pa., a corporation of New Jersey
No Drawing. Filed Apr. 25, 1968, Ser. No. 724,235
Int. Cl. C07c 15/24
U.S. Cl. 260—670
35 Claims

ABSTRACT OF THE DISCLOSURE

It has been found that aromatic compounds can be condensed by contacting an aromatic composition selected from the group consisting of
(a) an aromatic compound having at least 7 carbon atoms, provided there is at least one labile hydrogen atom attached to a nuclear carbon atom;
(b) an aromatic compound having at least 7 carbon atoms, provided there is at least one labile hydrogen atom attached to a nuclear carbon atom and at least one labile hydrogen atom attached to an alkyl carbon atom, said alkyl carbon atom being attached to a nuclear carbon atom;
(c) a mixture of aromatic compounds provided at least one of the aromatic compounds of said mixture has at least 7 carbon atoms, provided each aromatic compound of said mixture has at least one labile hydrogen atom and provided at least one of the aromatic compounds of said mixture has a labile hydrogen atom attached to a nuclear carbon atom, in liquid phase in the presence of a catalyst comprising a Bronsted acid and a metal of Group VIII at —10–250° C. The process can be used to dimerize like molecules or unlike molecules can be cross dimerized. For example, durene can be dimerized to produce a mixture of dimeric products, whose distribution can be controlled by the amount of catalyst and reaction conditions. Two products obtained from this condensation in fairly large yields are heptamethyldiphenylmethane and hexamethylanthracene. Durene can also be cross dimerized, for example, with mesitylene. The only product found was 2,3,3′,5,5′,6-hexamethyldiphenylmethane.

This invention relates to the production of condensed aromatic compounds having the aromatic nuclei coupled either directly or through a methylene bridge and having at least two hydrogen atoms less per molecule than the substrate. The types of such condensed aromatic compounds that can be produced by the process comprising this invention are biaryls, diarylmethanes and condensed polynuclear aromatics. The types of aromatic compounds which can be dimerized by this process include the parent aromatics such as naphthalene, partially hydrogenated aromatics such as 1,2,3,4-tetrahydronaphthalene and alkyl- and poly-alkylaromatics such as durene and 1-methylnaphthalene. In addition to alkyl groups having 1 to 20 carbon atoms, such aromatics may also bear other substituents such as halogen, preferably chlorine and bromine; alkyoxy groups; phenoxy groups; alkoxyalkyl groups; hydroxyl groups; carboxyl groups; amino groups; ester groups; acyl groups and the like. One embodiment is the application of the present invention to the dimerization of aromatic compounds.

The coupling of such compounds has been carried out previously with Group VIII metal salts, particularly ferric chloride or palladous acetate. The metal salt acts not as a catalyst but as a coreactant and hence must be present in stoichiometric quantities. Using palladium acetate as representative, the prior art process involves the reaction of a replaceable hydrogen on the ring of each of two aromatic molecules being dimerized with one molecule of palladium acetate to form one molecule of the desired dimer, two molecules of acetic acid and metallic palladium. The amount of palladium acetate required for such a reaction is therefore at least one mol per mol of dimer produced.

This process has been largely unattractive because of the necessity of stoichiomtric quantities of the metal salt. In commercial scale operations, the presence of the metal salt in such large quantities creates additional reactant handling problems, which can add substantially to the cost of such operations. It is also necessary to recover the metal produced as a result of the reduction and either dispose of it or regenerate it for further use.

Briefly stated the present invention is a process for intermolecular condensation of aromatic compounds comprising contacting an aromatic composition selected from the group consisting of
(a) an aromatic compound having at least 7 carbon atoms provided there is at least one labile hydrogen atom attached to a nuclear carbon atom;
(b) an aromatic compound having at least 7 carbon atoms, provided there is at least one labile hydrogen atom attached to a nuclear carbon atom and at least one labile hydrogen atom attached to an alkyl carbon atom, said alkyl carbon atom being attached to a nuclear carbon atom;
(c) a mixture of aromatic compounds provided at least one of the aromatic compounds of said mixture has at least 7 carbon atoms, provided each aromatic compound of said mixture has at least one labile hydrogen atom and provided at least one of the aromatic compounds of said mixture has a labile hydrogen atom attached to a nuclear carbon atom, in liquid phase in the presence of a catalyst comprising a Bronsted acid and a metal of Group VIII of the Periodic Table at an intermolecular condensation temperature.

Suitable aromatic feeds for dimerization are those which have at least 7 carbon atoms and at least one labile hydrogen atom that can be attached to either a nuclear carbon atom or to an alkyl carbon atom, which is itself attached to a nuclear carbon atom. The alkyl carbon atom can be part of a fused ring such as in 1,2,3,4-tetrahydronaphthalene. Some specific suitable aromatic hydrocarbons include toluene, xylene, durene, pentamethylbenzene, naphthalene, 1,2, 3,4-tetrahydronaphthalene, biphenyl, 1-methylnaphthalene, diphenylmethane, and the like.

The substrate need not necessarily comprise a single hydrocarbon. Certain combinations of hydrocarbons yield crossed "dimers" as the major products. The suitability of such mixtures of hydrocarbons for this formation of crossed products will be determined by the relative stabilities of the intermediate benzyl carbonium ions derived from the hydrocarbons and the relative basicities of the hydrocarbons. Thus, for example, equimolar quantities of durene and mesitylene yield a single crossed product:

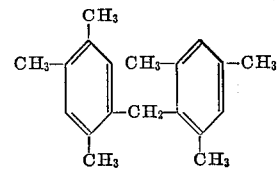

Other examples of suitable mixed substrates are durene plus naphthalene, durene plus 1,2,3,4-tetrahydronaphthalene, pentamethylbenzene plus naphthalene, and the like. Mixtures of very reactive hydrocarbons such as durene, pentamethylbenzene and even hexamethylbenzene with an excess of a much less reactive hydrocarbon such as benzene readily yield cross products, frequently of a diverse nature. Thus, a substrate comprising 0.025 mole of hexamethylbenzene and 1.0 mole benzene yields as the major products diphenylmethane, triphenylmethane and p-dibenzylbenzene.

The aromatic feed is added to the Bronsted acid, which also seves as the solvent for the reaction. By the term Bronsted acid is meant a substance that can give up a proton. Some specific Bronsted acids which are suitable include phosphoric acid, polyphosphoric acid, phosphoric acid saturated with boron trifluoride ($H_3PO_4/BF_3$), hydrogen fluoride, hydrogen fluoride-boron trifluoride mixtures, trichloroacetic acid, trifluoroacetic, trifluoroacetic acid/$BF_3$, and the like. The use of a trifluoroacetic acid solvent can be advantageous, particularly because of the improved solubility of the aromatic feed therein. Inasmuch as the initial step in the oxidative dimerization herein described is believed to be protonation of the aromatic compound, the reactivity within any given system will be determined in large part by the basicity of the aromatic compound and the acidity of the Bronsted acid. This means that for any given aromatic substrate the rate of the dimerization and the nature of the product or products, when more than one product is possible, will be determined by, and, hence, can be controlled by the acidity of the Bronsted acid. A Group VIII metal, preferably a noble metal such as platinum, palladium, rhodium, ruthenium or iridium is also present in the Bronsted acid. The combination of the acid and Group VIII metal acts as a catalyst for the oxidative condensation of the aromatic compounds. The metal can be supported or unsupported. Suitable supports include silica, alumina, carbon, material of predominately siliceous character such as diatomaceous earth, kieselguhr, fuller's earth, etc., or clays such as, bentonite, montmorillonite, etc. A particularly preferred catalyst is platinum or palladium on charcoal.

The reaction is carried out at a temperature in the range of −10 to 250° C., preferably 20–150° C. The optimum temperature will be determined by the nature of the aromatic feed and the particular catalyst system employed. For example, the viscosity of polyphosphoric acid requires a minimum temperature of approximately 200° C. in order to have a sufficiently fluid system, whereas acids having low viscosity and high volatility such as trifluoroacetic acid and hydrogen fluoride can be employed at room temperature or even below. The reaction time is usually .5 to 4 hours.

In one embodiment a gas that is inert to the reactants and catalyst is passed through the system. This gas displaces the adsorbed hydrogen from the catalyst and flushes it from the system. The reaction, however, will proceed without so flushing the hydrogen, but at a slower rate. Suitable hydrogen displacing gases include oxygen containing gases, which are thought to react with the displaced hydrogen, and inert gases such as nitrogen, helium, argon and the like, which are thought to merely physically entrain and remove the hydrogen. An oxygen containing gas is preferred and has been found to give higher reaction rates than an inert gas. The oxygen containing gas may be introduced as relatively pure oxygen or as a mixture of oxygen with diluent gas; air may be suitably employed. The gas is introduced into the reaction mixture at as fast a rate as possible in order to remove the adsorbed hydrogen but not so fast as to entrain or volatilize any of the reaction medium or products. In the case of oxygen containing gas, the gas is always present in excess, i.e., the gas is passed into the reaction medium faster than it reacts with the adsorbed hydrogen.

It has been found advantageous to vigorously agitate the reaction medium. This is usually achieved by high speed stirring. When a gas is passed through the reaction medium the high speed stirring disperses the gas and improves removal of hydrogen. The high speed stirring will also improve the contact within the reaction medium when the solubility of the aromatic in the solvent is low.

In another embodiment the solvent was concentrated (65–102%) phosphoric acid which has been saturated with boron trifluoride at 0° C. herein after referred to as $H_3PO_4/BF_3$. With this particular system it was found that highest conversions were obtained at a 75% acid concentration. The reaction proceeded best at an elevated temperature, e.g., about 100° C.

In another embodiment the solvent was trifluoroacetic acid to which was added zero to thirty volume percent of boron trifluoride hydrate. Using 0.1 to 1.0 gram of five percent platinum or palladium on charcoal per 100 ml. of this solvent and using oxygen as the displacing gas at room temperature the following dimeric products were obtained from the indicated aromatic substrates:

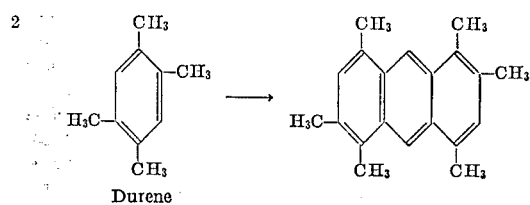

Durene

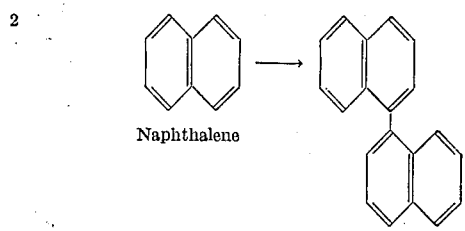

Pentamethylbenzene

Naphthalene 1,2,3,4-tetrahydronaphthalene

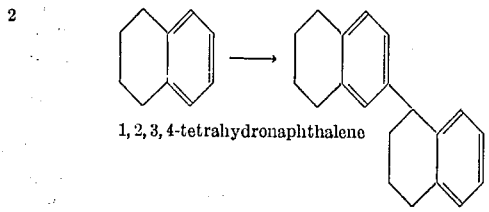

1-methylnaphthalene

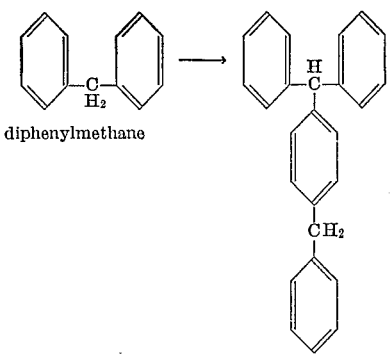

diphenylmethane

The product is easily recovered by filtering the reaction medium to remove the solid catalyst then pouring the filtrate into water. The acid dissolves in the water phase and the product is in an organic phase which is often a precipitate. The two phases are easily separated. The organic phase can be subjected to further water washes or to an alkali wash followed by water washes. In the case of very volatile acids, such as trifluoroacetic, the acid can be distilled off with subsequent water washing of the product.

EXAMPLE 1

A mixture of 1.0 gram of durene, 0.5 gram of 5 percent platinum supported on charcoal, 60 milliliters of trifluoroacetic acid and varying amounts of boron trifluoride hydrate through which oxygen was continuously bubbled was stirred vigorously for four hours at 25° C. in a 100 milliliter cylindrical gas reactor. The product was isolated by filtration to remove the platinum catalyst followed either by distillation of the acid or drowning with water and subsequent filtration. The resultant crude product mixture was analyzed by vapor phase chromatography and the individual products separated by preparative scale vapor phase chromatography and identified by a combination of infrared, nuclear magnetic resonance and mass spectroscopy and melting point. The results presented in Table I show the effect of temperature and boron trifluoride hydrate concentration on the reaction.

TABLE I

| Temperature (° C.) | 25 | 50 | 25 | 25 | 25 |
|---|---|---|---|---|---|
| BF$_3$.H$_2$O conc. (ml./60 ml. trifluoroacetic acid) | 0 | 0 | 1.0 | 3.0 | 15.0 |
| Conversion (percent) | 2 | 10 | 30 | 60 | 100 |
| Composition of dimeric product, percent: | | | | | |
| Hexamethyldiphenylmethane | 2 | 5 | 18 | 20 | (¹) |
| Heptamethyldiphenylmethane | 98 | 93 | 75 | 18 | (¹) |
| Hexamethylanthracene | | | Trace | 50 | (¹) |
| Others | | Trace | 2 | 7 | 12 | (¹) |

¹ Polymeric products only.

EXAMPLE 2

A mixture of 1.0 gram of pentamethylbenzene, 0.5 gram of 5 percent platinum supported on charcoal and 60 milliliters of trifluoroacetic acid through which oxygen was continuously bubbled was stirred vigorously for four hours at 25° C. and worked up as in Example 1. Approximately fifteen percent conversion was obtained. The resultant dimeric product comprised 24 percent of one isomer of octamethyldiphenylmethane, 5 percent a second higher-boiling isomer of octamethyldiphenylmethane, 64 percent of 2,2',3,3',4,4',5,5',6-nonamethyldiphenylmethane and 6 percent of an unidentified, higher-boiling material.

EXAMPLE 3

The reaction described in Example 2 was repeated except at 50° C. The conversion was increased to approximately 25 percent. The nature and distribution of the products remained the same.

EXAMPLE 4

The reaction described in Example 3 was repeated except that nitrogen was bubbled through the stirred reaction mixture instead of oxygen. The same products resulted, but at lower conversion.

EXAMPLE 5

A mixture of 2.0 grams of pentamethylbenzene, 0.5 gram of 5 percent rhodium supported on charcoal and 100 milliliters of trifluoroacetic acid was shaken for nineteen hours at 25° C. under an atmosphere of oxygen. The acid solution of hydrocarbons was separated from the rhodium catalyst by filtration and poured into 500 milliliters of ice water; the hydrocarbons were isolated by ether extraction and analyzed and identified as in Example 1. A 10 percent conversion to the octa- and nonamethyldiphenylmethanes obtained in Example 2 was observed.

EXAMPLE 6

A mixture of 25 grams of durene, 1.0 gram of 5 percent platinum supported on charcoal and 150 milliliters of 75 percent phosphoric acid saturated with boron trifluoride was stirred vigorously for four hours at room temperature with oxygen bubbling through. The reaction mixture was poured into 500 milliliters of ice water and the products isolated by ether extraction. The products were separated by elution chromatography from alumina followed by preparative vapor phase chromatography and identified by a combination of infrared, nuclear magnetic resonance and mass spectroscopy. The isolated products include: 8.6 grams recovered durene; 1.7 grams pentamethylbenzene; 0.1 gram hexamethylbenzene; 3.2 grams of a mixture of eight polymethylanthracenes of which 1,2,4,5,6,8-hexamethylanthracene predominates; 0.6 gram pentamethylphenol; 0.8 gram durenol; 0.1 mesitol and 2.4 grams of a dark-green, highly-polar material of undetermined composition. The lack of primary dimeric products such as hepta methyldiphenylmethane is attributed to the very low-solubility of durene in the reaction mixture and the relatively high acidity of the phosphoric acid-boron trifluoride mixture.

EXAMPLE 7

The reaction described in Example 6 was repeated except without the platinum on carbon catalyst. Only penta- and hexamethylbenzene in amounts similar to those reported in Example 6 could be isolated from the reaction mixture.

EXAMPLE 8

A mixture of 7.0 grams durene, 0.7 gram 5 percent platinum on charcoal and 70 milliliters of anhydrous hydrogen fluoride was shaken for five hours at room temperature in 150 milliliter stainless steel bomb pressured to fifty p.s.i. with oxygen. The products were similar to those reported in Example 6 except that the phenol fraction comprised mostly mesitol and durenol in approximately equal amounts accompanied by only a trace of pentamethylphenol.

EXAMPLE 9

A mixture of 25 grams naphthalene, 1.0 gram 5 percent platinum on charcoal and 150 milliliters 100 percent phosphoric acid saturated with boron trifluoride in a 500 milliliter "Morton" flask was stirred vigorously for four hours at 100° C. with a stream of oxygen bubbling through. The product was isolated, analyzed and identified as in Example 6. The isolated products include: 20.4 grams unreacted naphthalene; 1.1 gram 1,1'-binaphthyl; 0.4 gram 1,2'-binaphthyl, 0.6 gram mixed ternaphthyls and 0.1 gram polynuclear aromatics.

EXAMPLES 10–15

The reaction described in Example 9 was repeated except with variations in phosphoric acid concentration and temperature. The results, obtained by vapor phase chromatographic analysis and expressed relative yields are presented in Table II.

TABLE II

| Ex. | Temp. (° C) | $H_3PO_4$ Conc. (wt. percent) | Binaphthyls [1] | | | | Ternaphthyls [1] | | | | |
|---|---|---|---|---|---|---|---|---|---|---|---|
| | | | 1,1'- | 1,2'- | 2,2'- | Total | A | B | C | D | Total |
| 10 | 28 | 65 | 0.7 | 0.2 | Trace | 0.9 | 0.2 | 1.7 | 2.8 | Nil | 4.7 |
| 11 | 28 | 75 | 5.0 | 0.6 | Trace | 5.6 | 0.8 | 8.2 | 9.9 | 0.8 | 19.7 |
| 12 | 100 | 75 | 126 | 69 | 63 | 285 | 1.5 | 10.3 | 9.2 | 10.3 | 31.3 |
| 13 | 23 | 85 | 0.3 | Trace | Nil | 0.3 | 0.9 | 3.1 | 0.8 | Nil | 5.2 |
| 14 | 28 | 100 | 1.1 | 0.2 | Trace | 1.3 | 1.2 | 5.5 | 1.6 | Trace | 8.3 |
| 15 | 28 | 102 | 3.4 | 0.3 | Trace | 3.7 | 2.7 | 6.6 | 1.3 | 0.3 | 10.9 |

[1] Relative Yields.

EXAMPLE 16

A mixture of 1.0 gram of naphthalene, 0.5 gram 5 percent platinum on charcoal, 60 milliliters of trifluoroacetic acid and 1.0 milliliter of boron trifluoride hydrate with oxygen bubbling through and was stirred vigorously for four hours at room temperature in a 100 milliliter cylindrical reactor. The crude product was isolated by drowning in water followed by extraction with ether, then filtration and distillation of the extract. The product was analyzed by vapor phase chromatography, separated by preparative vapor phase chromatography and identified by a combination of infrared, nuclear magnetic resonance and mass spectroscopy. The only product was 1,1'-binaphthyl.

EXAMPLE 17

The reaction described in Example 16 was repeated except using 1,2,3,4-tetrahydronaphthalene (Tetralin) as the substrate. The only product was 6-(1-tetralyl) tetralin.

EXAMPLE 18

The reaction described in Example 16 was repeated except using 1-methylnaphthalene as the substrate. The only product was 4,4'-dimethyl-1,1'-binaphthyl.

EXAMPLE 19

The reaction described in Example 16 was repeated except benzene was the substrate and 5 milliliters of boron trifluoride hydrate were used. No reaction occurred.

EXAMPLE 20

The reaction described in Example 16 was repeated except an equimolar mixture of mesitylene and durene was the substrate and no boron trifluoride was used. The only product was 2,3,3',5,5',6-hexamethyldiphenylmethane.

EXAMPLE 21

A mixture of 1.0 gram of hexamethylbenzene, 20 milliliters benzene, 0.5 gram 5 percent platinum on charcoal and 1.0 milliliter boron trifluoride hydrate through which oxygen was bubbled and stirred vigorously for four hours at 50° C. in a cylindrical reactor. The reaction worked up as in Example 16, was shown to yield four major products. These are, in order of decreasing yield: diphenylmethane, triphenylmethane, p-dibenzylbenzene and tetramethyldiphenylmethane.

The present process thus provides a means of preparing a wide variety of hydrocarbon products having numerous uses, particularly as high temperature heat transfer mediums, as basic materials in the preparation of lubricants, pharmaceuticals, petrochemicals and pesticides.

The invention claimed is:

1. A process for intermolecular condensation of aromatic hydrocarbons comprising contacting an aromatic hydrocarbon selected from the group consisting of
   (a) an aromatic hydrocarbon having at least 7 carbon atoms, provided there is at least one labile hydrogen atom attached to a nuclear carbon atom;
   (b) an aromatic hydrocarbon having at least 7 carbon atoms, provided there is at least one labile hydrogen atom attached to a nuclear carbon atom and at least one labile hydrogen atom attached to an alkyl carbon atom, said alkyl carbon atom being attached to a nuclear carbon atom;
   (c) a mixture of aromatic hydrocarbons provided at least one of the aromatic compounds of said mixture has at least 7 carbon atoms, provided each aromatic hydrocarbon of said mixture has at least one labile hydrogen atom and provided at least one of the aromatic compounds of said mixture has a labile hydrogen atom attached to a nuclear carbon atom, in liquid phase in the presence of a catalyst comprising a Bronsted acid and a metal of Group VIII of the periodic table at an intermolecular condensation temperature.

2. The process according to claim 1 wherein the temperature is in the range of −10 to 250° C.

3. The process according to claim 2 wherein a hydrogen displacing gas is passed through the liquid phase.

4. The process according to claim 3 wherein said gas is selected from the group consisting of an oxygen containing gas and inert gas.

5. The process according to claim 4 wherein said gas is selected from the group consisting of oxygen containing gas, nitrogen, helium and argon.

6. The process according to claim 5 wherein the gas is oxygen containing.

7. The process according to claim 2 wherein the Bronsted acid is selected from the group consisting of phosphoric acid, polyphosphoric acid, phosphoric acid saturated with boron trifluoride, hydrogen fluoride, hydrogen fluoride admixed with boron trifluoride, trichloroacetic acid, trifluoroacetic acid and trifluoroacetic acid saturated with boron trifluoride.

8. The process according to claim 7 wherein a hydrogen displacing gas is passed through the liquid phase.

9. The process according to claim 8 wherein said gas is selected from the group consisting of oxygen containing gas and inert gas.

10. The process according to claim 9 wherein said gas is oxygen containing gas.

11. The process according to claim 2 wherein the Group VIII metal is selected from the group consisting of platinum, palladium, rhodium, ruthenium and iridium.

12. The process according to claim 11 wherein the metal is platinum or palladium.

13. The process according to claim 7 wherein the Group VIII metal is selected from the group consisting of platinum, palladium, rhodium, ruthenium and iridium.

14. The process according to claim 13 wherein a hydrogen displacing gas is passed through the liquid phase.

15. The process according to claim 2 wherein the temperature is in the range of 20–150° C.

16. The process according to claim 3 wherein there is high speed stirring.

17. The process according to claim 2 wherein the temperature is in the range of 20 to 150° C.

18. The process according to claim 11 wherein the metal is supported.

19. The process according to claim 14 wherein the metal is platinum or palladium and the gas is selected from the group consisting of oxygen containing gas and inert gas.

20. The process according to claim 19 wherein the gas is oxygen containing gas.

21. The process according to claim 19 wherein the hydrocarbon is durene.

22. The process according to claim 19 wherein the hydrocarbon is pentamethylbenzene.

23. The process according to claim 19 wherein the hydrocarbon is naphthalene.

24. The process according to claim 19 wherein the hydrocarbon is 1,2,3,4-tetrahydronaphthalene.

25. The process according to claim 19 wherein the hydrocarbon is 1-methylnaphthalene.

26. The process according to claim 19 wherein the hydrocarbon is a mixture of mesitylene and durene.

27. The process according to claim 19 wherein the hydrocarbon is a mixture of hexamethylbenzene and benzene.

28. The process according to claim 19 wherein the hydrocarbon is toluene.

29. The process according to claim 19 wherein the hydrocarbon is xylene.

30. The process according to claim 19 wherein the hydrocarbon is biphenyl.

31. The process according to claim 19 wherein the hydrocarbon is diphenylmethane.

32. The process according to claim 19 wherein the hydrocarbon is a mixture of durene and naphthalene.

33. The process according to claim 19 wherein the hydrocarbon is a mixture of pentamethylbenzene and naphthalene.

34. The process according to claim 19 wherein the hydrocarbon is a mixture of durene and benzene.

35. The process according to claim 19 wherein the hydrocarbon is a mixture of pentamethylbenzene and benzene.

References Cited

UNITED STATES PATENTS

| | | | |
|---|---|---|---|
| 3,244,721 | 4/1966 | Bain et al. | 260—670 X |
| 3,294,484 | 12/1966 | Ellis | 260—670 X |
| 3,401,207 | 9/1968 | Selwitz | 260—670 |

DELBERT E. GANTZ, Primary Examiner

C. R. DAVIS, Assistant Examiner

U.S. Cl. X.R.

260—668